Patented Apr. 16, 1940

2,197,479

UNITED STATES PATENT OFFICE

2,197,479

CARBAMIC ACID ESTERS OF MONOALKYL ETHERS OF POLYALKYLENE GLYCOLS

Frederick M. Meigs, Wilmington, Del., assignor, by mesne assignments, to E. I. du Pont de Nemours & Company, Wilmington, Del., a corporation of Delaware No Drawing. Application January 4, 1936, Serial No. 57,637

6 Claims. (Cl. 260—482)

This invention relates to new chemical compounds, and it pertains particularly to the esters of carbamic acid derived from certain ether-alcohols and to the use of these new compounds in the formulation of new compositions of matter.

For the purposes of this specification an ether-alcohol is defined as an alcohol containing one or more ether oxygen linkages in its molecule. The ether-alcohols can be broadly described by the formula:

in which R is an organic radical and R' is an aliphatic nucleus. The ether-alcohol carbamates, therefore, will be understood as having the general formula:

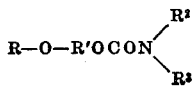

in which $R^2$ and $R^3$ may both be hydrogen atoms, e. g., $NH_2COOR'$—O—R, as in carbamic acid, or one or both may be organic radicals, such as ethyl or methyl.

It is an object of this invention to provide new ether-alcohol carbamates. It is particularly an object of the invention to provide ether-alcohol carbamates of low volatility and specifically those derived from ether-alcohols having a boiling point of 145° C. or higher. It is a further object of the invention to provide new compositions of matter employing these materials which compositions are particularly useful in the coating or plastic arts and wherein these new compounds serve as plasticizers or softeners. Other objects will be apparent from the following description.

The ether-alcohol carbamates contemplated by this invention comprise those derived from ether-alcohols which boil at 145° C. or higher, under atmospheric pressure and which have the general formula:

wherein R represents an alkyl, cyclic, alicyclic, saturated, or unsaturated group including any aliphatic monovalent straight chain, branched chains, or ring, for example, methyl, ethyl, propyl, N-butyl, cyclohexyl, dodecyl, octadecyl, tert-butyl, sec-butyl, isobutyl or such alkyl groups as correspond to the higher alcohol residues obtained in the synthesis of methanol by hydrogenation of carbon oxides; while R' is a divalent organic radical derived from a glycol which may contain ether oxygen linkages but no additional active groups such as ester, ketone, acid, amide or the like. Thus, R' may be:

—$CH_2.CH_2$— from ethylene glycol
—$CH_2CH_2CH_2$— from trimethylene glycol
—$CH(CH_3)CH_2$— from propylene glycol
—$CH_2CH_2$—O—$CH_2CH_2$— from diethylene glycol or it may be derived from butylene glycol, isobutylene glycol, triethylene glycol, polyethylene glycol, dipropylene glycol, cyclohexene glycol, tetramethylene glycol or decamethylene glycol, etc. The total carbon atoms in the R and R' groups taken together will be at least five and quite satisfactory products can be obtained using the monoalkyl ethers of ethylene or diethylene glycol.

The new ether-alcohol carbamates are generally colorless, odorless, essentially tasteless, substantially non-volatile at ordinary temperatures and pressures, and non-toxic. They may be purified readily and are relatively stable to air (oxidation), water, dilute acids, and dilute ammonium hydroxide. Because of their chemical constitution, which includes a combination of one or more ether groups, an ester group and an amide group, they show excellent compatibility with a large variety of materials commonly used in the coating and plastic arts. They are soluble in most organic solvents, completely miscible with many such solvents, frequently water-soluble and in some instances miscible with water in all proportions.

A few typical ether-alcohol carbamates as contemplated by this invention are given in the following table although these are to be understood as merely exemplary of the broad class of materials as described herein.

Table

| | | Boiling point | Water solubility |
|---|---|---|---|
| 1 | n-Butoxyethoxyethyl carbamate. | 150-1° C. at 2.5 mm... | Ca 10%. |
| 2 | Ethoxyethoxyethyl carbamate. | 162° C. at 11 mm...... | Miscible. |
| 3 | n-Butoxyethyl carbamate. | 142° C. at 11 mm...... | Ca 5%. |
| 4 | Iso-butoxyethoxyethyl carbamate. | | Ca 8%. |
| 5 | Higher alkyl * oxyethyl carbamate. | 127-134° C. at 2-3 mm. | Insoluble. |
| 6 | Higher alkyl * oxyethoxyethyl carbamate. | | Ca 1%. |

* The alkyl group from a higher alcohol fraction (boiling range 133-150° C.) obtained from the residue in methanol syntheses by reaction of carbon oxides and hydrogen in the presence of a catalyst.

All the above esters are liquids at ordinary temperatures and pressures.

The new carbamates may be prepared by any of the well known methods and the particular method of preparation does not constitute a part of this invention. Among the methods are:

1. The reaction of the ether-alcohol with carbamide under the influence of heat, with liberation of ammonia.
2. The reaction of the ether-alcohol with phosgene and subsequent reaction of the chlorocarbonate so obtained with ammonia to yield the carbamate.
3. The direct union of cyanic acid with the ether-alcohol.
4. The reaction of the ether-alcohol with carbamyl chloride with the elimination of hydrogen chloride to yield the carbamate.
5. The reaction of the ether-alcohol with a carbamate of a low boiling alcohol by ester interchange in the presence of a catalyst under the influence of heat.

The first two methods are particularly useful and Examples I and II below illustrate the use of Method 1 while Example III illustrates the use of Method 2 in the preparation of typical ether-alcohol carbamates, such as those contemplated by this invention.

Example I

| | Parts |
|---|---|
| n-Butoxyethoxyethanol ($C_4H_9OC_2H_4OCH_2CH_2OH$) | 3,400 |
| Carbamide | 420 |

The above mixture is heated with stirring at a temperature of 140–160° C. for thirty hours, in suitable apparatus provided with a reflux condenser to prevent loss of the ether-alcohol, a slow stream of inert gas, such as nitrogen, being blown through the reaction mixture, if desired, to facilitate removal of the ammonia gas evolved by the reaction. The clear, final solution, after cooling and filtering to remove any solid matter which may separate, is fractionated in vacuo. The n-butoxyethoxyethyl carbamate is obtained as a colorless, somewhat viscous liquid which boils at 156–160° C. under a pressure of 5 mm. of mercury. The yield is about 1,000 grams, or approximately 70% of the theoretical, as based on the carbamide used. Since about 2,500 grams of n-butoxyethoxyethanol are recovered, the yield is about 87%, calculated on the basis of this reactant.

Example II

| | Parts |
|---|---|
| n-Butoxyethanol ($C_4H_9OCH_2CH_2OH$) | 354 |
| Carbamide | 180 |

The above mixture is heated with stirring at a temperature of about 150° C. for two hours under conditions similar to those of Example I and after the solution has been cooled, filtered and fractionated in vacuo, the n-butoxyethyl carbamate is obtained as a colorless liquid which boils at 142° C. under a pressure of 11 mm. of mercury. The yield is 60 grams, but this may be increased considerably by increasing the reaction time.

Example III

| | Parts |
|---|---|
| Iso-butoxyethoxyethanol $\left(\begin{array}{c}CH_3\\ \phantom{x}\\ CH_3\end{array}\!\!\!\!\!>\!CHCH_2OC_2H_4OCH_2CH_2OH\right)$ | 75 |
| Phosgene | about 50 |
| Ammonium Hydroxide (conc.) | 175 |
| Crushed ice | 175 |

The liquid phosgene (the amount used is about 5–20% in excess of the theoretical) is cooled to about 0° C. and the iso-butoxyethoxyethanol added slowly while the reaction mixture is maintained at 0–10° C. (preferably 0–5° C.). After the ether-alcohol has been added, the mixture is allowed to stand for 10–18 hours, during which time the temperature may be permitted to rise gradually to room temperature. The liberated hydrogen chloride and excess phosgene are removed by blowing a stream of dry air through the mixture, whereupon the liquid, consisting largely of iso-butoxyethoxyethyl chlorocarbonate, is poured rapidly with vigorous stirring, into a mixture of amonium hydroxide and ice. The iso-butoxyethoxyethyl carbamate is formed immediately and most of it separates as an oily layer, the remainder being salted out with sodium chloride. The oil is separated from the aqueous layer, dried over anhydrous sodium sulfate, for example, and obtained as a pale yellow oil. Although further purification is hardly necessary, color may be removed by treatment with decolorizing carbon or the ester may be distilled. The yield is about 92 grams, or approximately 96% of the theoretical.

It is to be noted that the ether-alcohol carbamates contemplated by this invention are all liquids or low melting solids. This is indeed surprising when it is realized that the alkyl carbamates are solids of relatively high melting point.

It might be expected, therefore, that the ether-alcohol carbamates would show melting points of this order at least and would melt at higher temperatures than the alkyl carbamates of corresponding carbon content. That this is not true is evident from the characteristics of the new ether-alcohol carbamates described herein.

Because of the surprising physical properties, including very low melting points, high boiling points, solubility, stability, compatibility, non-toxicity, freedom from substantial odor, color or taste, ready preparation, easy purification, etc., these new chemical compounds are useful for many purposes. They find application as lubricating fluids, hydraulic fluids; in medicinals, cosmetics, perfumes; as emulsifying assistants because of their ability to lower surface tension.

Because of the remarkable solubility, compatibility, stability, low melting point and low volatility, they are particularly useful as plasticizing or softening agents for a large variety of materials and are valuable in compositions suitable for paints, varnishes, lacquers, enamels, molding compositions, plastics of all kinds, sheets, tubes, rods, filaments. The fact that these new compounds are usually normally liquid or very low melting solids makes them particularly useful in compositions where transparency and clarity are desired, inasmuch as they have little or no tendency to crystallize.

Among the materials readily plasticized or softened may be mentioned cellulosic materials including regenerated cellulose, cellulosic materials regenerable from aqueous or alkaline-aqueous dispersions such as glycol cellulose, cellulose glycollic acid, lowly etherified or esterified cellulose (lowly methylated or ethylated); cellulose esters like cellulose nitrate, cellulose acetate, cellulose propionate, cellulose acetate-propionate, cellulose acetate-stearate; cellulose ethers like ethyl cellulose, benzyl cellulose, dodecyl ethyl cellulose; cellulose ether-esters like ethyl cellulose acetate; amino cellulose like deacetylated chitin. Albuminous substances such as gelatin, casein, casein-formaldehyde or the like may be softened or plasticized. Resinous materials like rosin, dammar, alkyd resins, polyvinyl resins, polyester resins derived from acrylic or methacrylic acids, phenol-aldehyde resins, urea aldehyde resins and similar natural or synthetic resins may be plasticized.

No claim is made in this case to the use of ether alcohol carbamates as non-deforming agents or non-deforming softeners for regenerated cellulose film and other films cast from aqueous cellulosic solution, this being the subject matter of my U. S. A. Patent No. 2,170,829 filed January 4, 1936, and issued August 29, 1939.

As illustrative of the use of these new ether-alcohol carbamates for plasticizing or softening, the following examples are set forth:

Example IV

A sheet of regenerated cellulose in the gel state, that is as it is obtained during its manufacture after purification and before drying, is impregnated with a 5% aqueous solution of n-butoxyethoxyethyl carbamate. The treated sheet is then dried in the usual manner whereupon the product will be transparent and flexible, durable, and superior in many respects to a similar regenerated cellulose sheet softened with the usual materials, such as glycerin.

Example V

| | Parts |
|---|---|
| Cellulose acetate (acetone soluble lacquer type) | 15 |
| Acetone | 75 |
| Alcohol | 20 |
| Ethyl lactate | 10 |
| Ethyl acetate | 10 |
| Higher alkyl oxyethyl carbamate (Compound #5 of Table I) | 5 |

This composition may be used for casting a flexible cellulose acetate foil which will be transparent, flexible, durable, non-tacky and substantially odorless.

Example VI

| | Parts |
|---|---|
| Nitrocellulose (7 seconds) | 10 |
| Butoxyethyl carbamate | 5 |
| Ethyl acetate | 45 |
| Toluene | 25 |
| Alcohol | 15 |

This composition may be used for the preparation of sheets, films or coatings and when the solvent has been removed at ordinary or elevated temperatures, the films are glass-clear, dry and well plasticized.

Example VII

| | Parts |
|---|---|
| Casein | 15 |
| Ethoxyethoxyethyl carbamate | 7.5 |
| 1% ammonium hydroxide | 85 |

Films prepared by casting this composition are clear, dry and plasticized. Water-soluble carbamates are generally preferred for softening gelatin, casein, glue, etc.

It is within the scope of the invention to modify the coating compositions, etc., described in these examples to suit the particular purposes at hand. Thus, other cellulose derivatives may be used. Resins, other plasticizers, fillers, pigments, coloring matter and the like may be added. If a moistureproofing coating composition is desired, for example, a moistureproofing agent such as paraffin wax may be included.

When coating compositions are formulated, they may be of the type which include cellulose derivatives or they may be free of cellulose derivatives and they may be used for coating a variety of materials such as wood, metal, fabrics, leather, gelatin, casein, paper of all kinds, cellulosic materials such as sheets or films of regenerated cellulose, glycol cellulose, cellulose glycollic acid, celluose ethers, cellulose esters, cellulose ether-esters, or other smooth, dense non-fibrous, substantially non-porous sheet material. Sheeting of rubber or rubber derivatives may also be used as a base to receive the coating.

A particular advantage of these new ether-alcohol carbamates resides in their non-volatility so that substances or compositions flexibilized, plasticized or softened therewith retain their flexibility or softness indefinitely. As a result the durability of products made through the use of these compounds is greatly increased.

Since the invention is capable of considerable modification, it is intended that any embodiment which conforms to the spirit of the invention, be included within the scope of the claims.

I claim:

1. A carbamate of a monoalkyl ether of a polyalkylene glycol.

2. A carbamate of a monoalkyl ether of a diethylene glycol.

3. n-Butoxyethoxyethyl carbamate.

4. A member of the group consisting of n-butoxyethoxyethyl carbamate, ethoxyethoxyethyl carbamate, and iso-butoxyethoxyethyl carbamate obtained from the residue in methanol synthesis by reaction of carbon oxides and hydrogen.

5. A carbamate of a monoalkyl ether of a polyethylene glycol.

6. A member of the group consisting of ethoxyethoxyethyl carbamate, n-butoxyethoxyethyl carbamate, iso-butoxyethoxyethyl and alkyloxyethoxyethyl carbamate, the alkyl radical in the last mentioned compound being the alkyl group from a higher alcohol fraction (boiling range 133°–150° C.).

FREDERICK M. MEIGS.